United States Patent [19]

Janocha et al.

[11] Patent Number: 5,026,592
[45] Date of Patent: Jun. 25, 1991

[54] OPAQUE MULTILAYERED FILM HAVING AN INHERENT RESISTANCE TO DELAMINATION

[75] Inventors: Siegfried Janocha, Wiesbaden; Gunter Schloegl, Kelkheim; Guenther Crass, Taunusstein; Lothar Bothe, Mainz-Gonsenheim, all of Fed. Rep. of Germany

[73] Assignee: Hoechst Aktiengesellschaft, Frankfurt am Main, Fed. Rep. of Germany

[21] Appl. No.: 288,268

[22] Filed: Dec. 22, 1988

[30] Foreign Application Priority Data

Dec. 23, 1987 [DE] Fed. Rep. of Germany ....... 3743791

[51] Int. Cl.$^5$ .............................................. B32B 3/00
[52] U.S. Cl. ................................... 428/204; 428/215; 428/218; 428/349; 428/402; 428/516
[58] Field of Search ............... 428/516, 349, 204, 215, 428/218, 402

[56] References Cited

U.S. PATENT DOCUMENTS 4,303,708 12/1981 Gebhardt et al. ..................... 428/35
4,366,296 12/1982 Kitagawa et al. ................... 525/247
4,525,416 6/1985 Hammerschmidt et al. ........ 428/220
4,652,489 3/1987 Crass et al. .......................... 428/349

FOREIGN PATENT DOCUMENTS 60-66654 4/1985 Japan .

Primary Examiner—Edith Buffalow
Attorney, Agent, or Firm—Foley & Lardner

[57] ABSTRACT

Disclosed is an opaque, biaxially stretch-oriented, polyolefinic multilayered film comprising an opaque core layer and two transparent top layers. The core layer contains a mixture of 1) about 45 to 90% by weight of a thermoplastic polymer comprising propylene,
2) about 5 to 25% by weight of an inert, particulate filler, and
3) about 5 to 30% by weight of a hydrocarbon resin being compatible with the thermoplastic polymer and having a softening point in the range from about 100° to 160° C., the percentages being each time related to the total weight of the mixture. The top layers are free from admixtures comprising particulate filler and resin. The film possesses high resistance to delamination.

22 Claims, No Drawings

OPAQUE MULTILAYERED FILM HAVING AN INHERENT RESISTANCE TO DELAMINATION

BACKGROUND OF THE INVENTION

The present invention relates to a coextruded, biaxially stretch-oriented, opaque polyolefinic multilayered film comprising an opaque core layer and two transparent top layers.

Within the scope of this disclosure, the term "opaque" is to be understood as defining the property of the respective layer to scatter visible light.

From the state of the art, quite a number of opaque polyolefinic films are known, which either are single-layered films and are commonly employed as synthetic paper or comprise an opaque carrier film and one or two transparent top layers applied thereto. As an example of the numerous publications concerning opaque films, reference is made to DE-B-28 14 311.

It is one common feature of the known opaque films that their opaque appearance results from the fact that due to the inert fillers contained in the opaque layer, in combination with the biaxial stretching under defined process conditions, a great number of micro-cavities (vacuoles) are produced within the opaque layer, where the visible light penetrating through the layer is refracted. During the stretching of the film, the polymer matrix is torn at the peripheries of the grains of inorganic and/or organic fillers which are incompatible with the polyolefin, which leads to the formation of the mentioned vacuoles, i.e., of free (empty, unfilled) spaces. Of course, these vacuoles or micro-cavities are distributed over the whole volume of the filler-containing layer.

Due to their structure, all known opaque films possess a more or less pronounced tendency towards delamination, i.e., they show little strength in the level of the opaque layer. For a few special applications, this readiness to delamination of the opaque layer is quite advantageous (see EP-A-0,093,370), but in many other fields of application the delamination tendency of opaque films is highly undesirable and should be avoided.

SUMMARY OF THE INVENTION

Accordingly, it is the object of the present invention to provide a coextruded, biaxially stretch-oriented, opaque polyolefinic multilayered film possessing a high resistance to delamination.

In accomplishing the foregoing objective, there has been provided, in accordance with one aspect of the present invention, a coextruded, biaxially stretch-oriented, opaque polyolefinic multilayer film comprising:
a) a first transparent top layer;
b) an opaque core layer comprising a mixture of
   1) about 45 to 90% by weight of a thermoplastic polymer comprising propylene,
   2) about 5 to 25% by weight of an inert, particulate filler, and
   3) about 5 to 30% by weight of a hydrocarbon resin which is compatible with the thermoplastic polymer and has a softening point between about 100° and 160° C.; and
c) a second transparent top layer, the percentages being each time related to the total weight of the mixture. In a preferred embodiment, the core layer further comprises a phosphite compound as a stabilizer.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

The polymer of the core layer is a propylene homopolymer or a copolymer or terpolymer of propylene and ethylene or alpha-olefins having 4 to 8 carbon atoms or a mixture of at least two of the mentioned compounds, in particular a mixture of a propylene homopolymer and a propylene co- or terpolymer and/or other polyolefins having 2 to 6 carbon atoms, especially polyethylene. The propylene homopolymer possesses a high proportion, especially of more than 90%, preferably of more than 95%, of isotactic groups. The isotactic proportion is determined from the mass of the polymer minus the mass of the n-heptane-soluble proportion. In general, the amount of non-propylene comonomers contained in the co- and terpolymers is not more than about 10% by weight, based on the polymer. Suitable co- and terpolymers of propylene include, for example, block copolymers or random copolymers of propylene with alpha-olefins having two or four carbon atoms (butene-1). The polymer of the core layer advantageously has a melt flow index in the range from about 0.5 g/10 min to about 8 g/10 min at 230° C. and 2.16 kp load (DIN 53,735), especially from about 1.5 g/10 min to about 4 g/10 min.

The particulate fillers are inorganic or organic pulverulent materials which are incompatible with the polymer of the core layer. Suitable inorganic fillers include, for example, calcium carbonate, aluminum silicates, titanium dioxide and silicon dioxide. Among the aluminum silicates, those which contain alkali metals and/or alkaline earth metals, are preferred. Suitable organic filler particles consist, for example, of polyester, in particular polybutylene terephthalate; polyamides, in particular polyamide-6; or polyacrylic resins. Preference is given to inorganic white particles having a high degree of whiteness. It should amount to at least 90%, in particular 95%, and is determined according to DIN 53 163. The aspect ratio (particle geometry value), i.e., the ratio of particle surface area to particle thickness, is less than 8, preferably less than 4, and particularly preferably less than 2. The particle geometry value of a cubic particle would be 1. The particles may also be ball-shaped. The average particle size is about 0.2 to 4 μm, preferably 2 to 3 μm, the maximum particle size being approximately 25 μm. As stated above, the added amount of fillers is in the range of about 5 to 25% by weight, amounts of between 5 and 15% by weight being preferred.

The hydrocarbon resin added to the core layer, in accordance with the invention, is a low molecular weight synthetic resin. It has a softening point in the range of about 100° to 160° C., preferably of 120° to 140° C., determined according to ASTM E 28.

In general, the hydrocarbon resins are obtained from resin-forming substances, such as styrene, methylstyrene, vinyltoluene, indene, pentadiene, cyclopentadiene, and the like. A more detailed description is given in Ullmanns Enzyklopaedie der Technischen Chemie [Ullmann's Encyclopedia of Technical Chemistry], 4th revised and expanded edition, Verlag Chemie, Weinheim, West Germany. Within this invention, particular preference is given to hydrogenated cyclopentadiene resins. Their Saybolt color-number, determined according to ASTM D 158, is greater than 20, preferably greater than 25.

To prevent a thermal degradation of the polymers during their processing in the course of the film manufacturing process, a stabilizer comprising a phosphite compound is added to the mixture of components forming the core layer, in an amount of about 0.2 to 0.8% by weight. The following compound has been found to be particularly suitable for stabilizing the color:

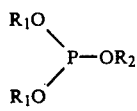

In this formula, $R_1$ and $R_2$ denote a nonylphenyl radical or a 2,4-di-tert.-butylphenyl radical. It is also possible for $R_1$ to be a phenyl radical and for $R_2$ to be a n-decyl radical.

As top layers, all kinds of customary top layers, i.e., sealable and non-sealable types, can principally be applied. Non-sealable top layers have a softening temperature which is not more than about 10° C. below, and optionally may also be equal to or higher than, the softening temperature of the core layer, and they are, for example, made of propylene homopolymers.

Olefin resin compositions which can be employed for sealable top layers are in particular comprised of co- or terpolymers of ethylene, propylene, butylene or other alpha-olefins having up to 10 carbon atoms or of mixtures thereof, of the types conventionally employed for sealable layers. Usually they comprise a copolymer of ethylene and propylene having an ethylene content of about 4 to 10% by weight, but it is likewise possible to use copolymers of ethylene and butylene or mixtures of ethylene/butylene copolymers and ethylene-/propylene/butylene terpolymers. Resins of this type have a melt flow index of between about 0.1 g/10 min and 16 g/10 min, in particular of between 6 g/10 min and 12 g/10 min, at 230° C. and under a load of 2.16 kp (DIN 53735).

In accordance with this invention, the top layers have thicknesses of between about 0.1 and 5 μm, preferably between 0.5 and 3 μm. The total thickness of the multilayered film varies between about 20 and 120 μm, preferably between 30 and 80 μm.

Depending on the intended use of the film, further superficial coatings may be applied to the top layers, such as partial or continuous coatings of a cold-sealable material or vapor-deposited, extremely thin metal layers, for example, of aluminum, or paper layers, such that a composite paper or cardboard material is obtained.

In a particularly preferred embodiment, the film according to this invention is coated with two different top layers, which impart bifunctional properties to the film, as far as its surfaces are concerned. The first, thinner top layer comprises a propylene co- or terpolymer with alpha-olefins having 2 to 8 carbon atoms; or a polymer mixture comprising two or more of these polymers and optionally polyethylene; or only polyethylene. The amount of propylene does not exceed 95.5% by weight, relative to this top layer. This top layer is preferably comprised of a propylene/ethylene copolymer containing about 4.5 to 10% by weight of ethylene units or of polypropylene/polyethylene blends containing about 5 to 10% by weight of polyethylene. Of the conventionally employed polyethylene types, particular preference is given to LLDPE. This layer has a thickness of about 0.1 to 2 μm, preferably of 0.4 to 0.8 μm. The surface gloss is less than 25, measured at an angle of 20°.

The other, thicker top layer consists of a propylene homopolymer or of a propylene/ethylene copolymer which contains not more than 3.5% by weight of ethylene and at least 96.5% by weight of propylene units, whereby copolymers of propylene and ethylene having an ethylene content of about 2 to 3% by weight are particularly preferred. It is of particular advantage for this thicker top layer if the proportion of isolated ethylene components, i.e., the proportion of individual ethylene units which are surrounded by propylene units is higher than about 85%, in particular higher than 95%, relative to the total amount of ethylene. This layer has a thickness of between about 1.5 and 5 μm, in particular of between 2 and 4 μm. Its surface gloss is greater than 40, in particular greater than 50, measured at an angle of 20°. The surface gloss is determined in accordance with DIN 67 530.

The proportion of isolated ethylene components is determined by means of known methods with the aid of $C_{13}$ NMR-spectroscopy. The copolymer to be examined is dissolved in a solvent mixture comprising 65% by volume of hexachlorobenzene and 35% by volume of 1,1-dideutero-tetrachloroethane, such that a 10% by weight strength solution is obtained. Octamethyltetrasiloxane (OMTA) is added as a reference standard. The 67.9 MHZ-$C_{13}$-nuclear resonance spectrum is measured at 130° C. The spectra are evaluated by the method described in J. C. Randall, "Polymer Sequence Distribution", Academic Press, New York, 1977.

The distribution factor VF is defined as $$V_F = C_i / (C_G - C_i)$$

$C_G$ denoting the total ethylene content (% by weight) of the copolymer and $C_i$ denoting the proportion (% by weight) of ethylene units which are present in the molecule chain as isolated units, i.e., between two propylene units.

This preferred film represents a material that can be employed bifunctionally, i.e., the desired superficial luster (matte or glossy) is obtained by selection of the appropriate top layer in accordance with the individual requirements. This alternative choice is of particular interest with respect to the further processing of the film, as will be explained in greater detail in the Examples.

The multilayered film according to this invention is produced by coextruding the melts of the polymer materials forming the individual layers, chilling the coextrudate obtained and finally biaxially orienting and heat-setting the coextruded film. In a preferred embodiment of the process, stretch-orienting is performed such that the polymer matrix of the core layer is torn open at the places where the inert filler particles are, whereby microcavities are formed. As a result thereof, the film has a density which is below the purely arithmetic density calculated from the densities of the individual components of the core layer. Preferably, the core layer has a density of 0.8 g/cm$^3$ or less, in particular of 0.65 g/cm$^3$ or less. If appropriate, the surfaces of the top layers can be subjected to another surface treatment following heat-setting, in order to facilitate the application of further coatings or to improve the adhesive or laminating strength of the film. By a corona treatment, the surface tension of the film can be increased to values above 36 mN/m, and thus its printability can be considerably improved.

The core layer is preferably produced employing the masterbatch method, i.e., in accordance with the desired contents of resin and filler, the polypropylene raw material, filler masterbatch and resin masterbatch are fed into an extruder for producing the core layer. As is known, the term "masterbatch" defines a mixture, in particular a granular, dust-free concentrate of a plastic raw material with a high content of fillers, which is used as an intermediate product in the compounding of plastic materials, for example, as an additive which is added to a filler-free granulate prior to extrusion for the production of a certain number of filler-containing shaped articles. The masterbatch employed in accordance with this invention for the addition of the particulate filler contains more than about 30% by weight, preferably more than 40% by weight of particulate filler, relative to the total weight of polymers plus fillers, and is present in the form of cylindrical or lenticular granules. The masterbatch employed for the addition of the resin has a resin content of about 40 to 60% by weight, preferably of 40 to 50% by weight, and a propylene content of about 40 to 60% by weight, preferably of 50 to 60% by weight.

Additionally, the core layer and/or the top layers can contain customary additives, such as antistatic agents, slip agents or stabilizers.

Due to its advantageous properties, the film according to the present invention is suitable for a number of different applications, in particular for those fields of application where a high resistance to delamination of the core layer is required. Apart from its use as packaging material or heat-sealable film for closing packaging containers, it is, in particular, also possible to employ it for technical applications, for example, as laminating film, as base film for self-adhesive labels or adhesive tapes or as in-mold labels. As is known, in-mold labels can be inserted into the mold in the production of injection-molded articles or bottle-type containers of polyolefinic materials. The injection-extruded material then combines with the sealing layer of the inserted labelling film.

By means of the Examples which follow the invention will be explained in greater detail and compared with the state of the art.

EXAMPLE 1

A three-layered film was produced by coextrusion, which after biaxial stretching and subsequent heat-setting had a total thickness of 80 μm. The top layers covering the two surfaces of the core layer had a thickness of about 0.6 μm each. Both top layers were comprised of a random ethylene/propylene copolymer having an ethylene content of 5% by weight, whereby the proportion of isolated ethylene components was 90% ($V_F$=9), relative to the total amount of ethylene. The core layer was comprised of 80% by weight of polypropylene, 10% by weight of $CaCO_3$ (average particle size 3 μm, degree of whiteness 93%) and 10% by weight of a hydrogenated hydrocarbon resin based on cyclopentadiene (softening temperature 140° C., Saybolt color number 26). Additionally, it contained 0.5% by weight, relative to the weight of the core layer, of a phosphorus containing stabilizer which is commercially available under the tradename of IRGAFOS p-EPQ from Ciba-Geigy.

The luster values measured on the resulting film are given in the table at the end of the Examples. The resistance to delamination of the core layer was higher than 2.6N/15 mm, and the density of the core layer was 0.60 g/cm$^3$.

EXAMPLE 2

A film was produced as described in Example 1, except that the content of hydrocarbon resin was 20% by weight (luster values see Table). The resistance to delamination of the core layer was higher than 2.6N/15 mm, its density was 0.65 g/cm$^3$.

EXAMPLE 3

A three-layered film was produced, which had a total thickness of 80 μm. Different top layers were provided on two surfaces of the core layer.

Top layer 1 had a thickness of 3.5 μm and was comprised of a propylene/ethylene copolymer having an ethylene content of 2.2% ($V_F$=19). Top layer 2 had a thickness of 0.6 μm and was comprised of a propylene/ethylene copolymer having an ethylene content of 5%. The core layer was comprised of 80% by weight of polypropylene, 10% by weight of $CaCO_3$ (average particle size 3 μm, degree of whiteness 93%) and 10% by weight of a hydrogenated hydrocarbon resin based on cyclopentadiene (softening temperature 140° C., Saybolt color number 26).

The luster values measured on the surfaces of the film obtained in Example 3 are also compiled at the end of the Examples. The core layer had a resistance to delamination of more than 2.6N/15 mm, its density was 0.62 g/cm$^3$.

COMPARATIVE EXAMPLE A

A film was prepared as described in Example 1, except that the cyclopentadiene resin was omitted from the core layer. The core layer had a resistance to delamination of 1.2N/15 mm, its density was 0.60 g/cm$^3$.

COMPARATIVE EXAMPLE B

A film was prepared as described in Example 3, except that the cyclopentadiene resin was omitted from the core layer. The core layer had a resistance to delamination of 1.2N/15 mm, its density was 0.62 g/cm$^3$.

METHOD TO DETERMINE THE RESISTANCE TO DELAMINATION

A 1.5 cm wide strip of adhesive tape is stuck onto the film sample to be tested. After 5 minutes, the adhesive tape is peeled off by means of a tensile strength tester (speed: 0.2 m/min). The resistance to delamination is defined as being very good when no separation can be detected within the vacuole-containing core layer after the removal of the adhesive tape.

The films prepared as described above were subjected to this delamination test. The films of Examples 1 to 3 did not show any signs of delamination, whereas delamination was stated when the adhesive tape was removed from the comparative samples. The force/path diagram showed a resistance to delamination of the Comparative samples of 1.2N/15 mm. The films according to Examples 1 to 3 did not delaminate, i.e., their resistance to delamination was greater than 2.6N/15 mm, which was the force required to peel off the adhesive tape.

|  | Lustre at 20° | |
| --- | --- | --- |
|  | Top layer 1 | Top layer 2 |
| Example 1 | 12 | 12 |
| Example 2 | 15 | 15 |
| Example 3 | 70 | 10 |
| Comp. Example A | 8 | 8 |
| Comp. Example B | 35 | 8 |

What is claimed is:

1. A coextruded, biaxially stretch-oriented, opaque polyolefinic multilayered film comprising:
   a) a first transparent top layer;
   b) an opaque core layer comprising a mixture of
      1) about 45 to 90% by weight of a thermoplastic polymer comprising propylene,
      2) about 5 to 25% by weight of an inert, particulate filler, and
      3) about 5 to 30% by weight of a hydrocarbon resin which is compatible with the thermoplastic polymer and has a softening point between about 100° to 160° C., and
   c) a second transparent top layer, the percentages being each time related to the total weight of the mixture.

2. A film as claimed in claim 1, wherein said polymer is a propylene homopolymer.

3. A film as claimed in claim 1, wherein said polymer is a copolymer or terpolymer comprising propylene and ethylene or ($C_4$–$C_8$) alpha-olefins.

4. A film as claimed in claim 1, wherein said core layer further comprises from about 0.2 to 0.8% by weight, based on the weight of the mixture, of a stabilizer comprising a phosphite compound.

5. A film as claimed in claim 4, wherein said phosphite compound has the general formula I

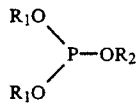

wherein
$R_1$ and $R_2$ denote a nonylphenyl radical or a 2,4-di-tert-butylphenyl radical.

6. A film as claimed in claim 4, wherein said phosphite compound has the general formula I

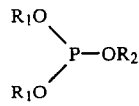

wherein
$R_1$ denotes a phenyl radical, and
$R_2$ denotes an n-decyl radical.

7. A film as claimed in claim 1, wherein said filler comprises from about 5 to 15% by weight of said mixture.

8. A film as claimed in claim 7, wherein said filler has an average particle size of about 0.2 to 4 µm, a particle geometry value of less than 8 and a degree of whiteness of at least 90%.

9. A film as claimed in claim 1, wherein at least one of said transparent top layers is heat-sealable.

10. A film as claimed in claim 1, wherein at least one of said transparent top layers is not heat-sealable.

11. A film as claimed in claim 10, wherein said transparent top layer comprises an isotactic propylene homopolymer.

12. A film as claimed in claim 1, wherein at least one of the surfaces of said film is provided with a layer comprising a cold-sealable layer, a metal layer or a paper layer.

13. A film as claimed in claim 1, wherein said transparent top layers have a thickness of about 0.1 to 5 µm, whereby the total thickness of said film is between about of 20 to 120µm.

14. A film as claimed in claim 13, wherein said transparent top layers have a thickness of 0.5 to 3 µm.

15. A film as claimed in claim 1, wherein said filler comprises calcium carbonate, titanium dioxide, silicon dioxide or an aluminum silicate.

16. A film as claims in claim, 1, wherein said filler comprises a polyester or a polyamide.

17. A film as claimed in claim 1, wherein the density of said core layer does not exceed 0.8 g/cm³.

18. A film as claimed in claim 17, wherein the density of said core layer does not exceed 0.65 g/cm³.

19. A film as claimed in claim 1, wherein the resistance to delamination of said core layer is at least 1.8N/15 mm.

20. A film as claimed in claim 19, wherein the resistance to delamination of said core layer is at least 2N/15 mm.

21. A film as claimed in claim 1, wherein said first transparent top layer has a thickness of about 0.1 to 2 µm and comprises a propylene copolymer or terpolymer, a mixture of two or more propylene copolymers or terpolymers, or polyethylene, with a maximum propylene content of 95.5% by weight, and wherein said second transparent layer has a thickness of about 1.5 to 5 µm and comprises a propylene homopolymer or a propylene/ethylene copolymer, with a minimum propylene content of 96.5% by weight.

22. An adhesive tape comprising an adhesive layer and a base film comprising a film as claimed in claim 1.

* * * * *